United States Patent [19]
Sylvain et al.

[11] Patent Number: 5,800,017
[45] Date of Patent: Sep. 1, 1998

[54] SEAT STRUCTURE FOR A MOTOR VEHICLE PROVIDED WITH AN IMPROVED CONTROL OF THE ARTICUATION OF THE BACKREST

[75] Inventors: Harry Sylvain; Perier Bernard, both of Nogent sur Vernisson, France

[73] Assignee: Cesa-Compagnie Europeenne de Sieges pour Automobiles, Levallois-Perret Cedex, France

[21] Appl. No.: 752,232

[22] Filed: Nov. 19, 1996

[30] Foreign Application Priority Data

Nov. 29, 1995 [FR] France ..................... 95 14112

[51] Int. Cl.$^6$ ..................................... B60N 2/22
[52] U.S. Cl. .................. 297/367; 297/359; 297/378.11; 297/378.12
[58] Field of Search ..................... 297/367, 370, 297/359, 378.11, 378.12

[56] References Cited

U.S. PATENT DOCUMENTS

| | | | |
|---|---|---|---|
| 3,957,312 | 5/1976 | Bonnaud | 297/378.12 X |
| 4,146,267 | 3/1979 | Mori et al. | |
| 4,268,086 | 5/1981 | Okuyama | 297/367 X |
| 4,466,661 | 8/1984 | Narita | 297/367 |
| 4,634,180 | 1/1987 | Zaveri | 297/367 X |
| 4,634,182 | 1/1987 | Tanaka | 297/367 X |
| 4,696,515 | 9/1987 | Heesch | 297/354.12 X |
| 4,765,681 | 8/1988 | Houghtaling et al. | 297/367 |
| 4,913,494 | 4/1990 | Ikegaya | |
| 5,154,476 | 10/1992 | Haider et al. | |
| 5,383,710 | 1/1995 | Premji | 297/367 X |
| 5,425,568 | 6/1995 | Sliney et al. | 297/359 X |

FOREIGN PATENT DOCUMENTS

| | | | |
|---|---|---|---|
| 53993 | 10/1974 | Australia | 297/367 |
| 0006610 | 1/1980 | European Pat. Off. | 297/367 |
| 505593 | 9/1992 | European Pat. Off. | |
| 3829701 | 1/1980 | Germany | 297/378.12 |
| 405038306 | 2/1993 | Japan | 297/367 |
| 1162026 | 8/1969 | United Kingdom | 297/367 |

*Primary Examiner*—Peter M. Cuomo
*Assistant Examiner*—David E. Allred
*Attorney, Agent, or Firm*—Sughrue, Mion, Zinn, Macpeak & Seas, PLLC

[57] ABSTRACT

This seat structure comprises a backrest (12) pivotally mounted on another part (32) of the seat structure by a lockable articulation (34) having a transverse axis, and a mechanism (70) for controlling the unlocking of the articulation. This control mechanism (70) includes two control levers (72, 74) separately articulated to two distinct parts (12, 16) of the seat structure for movement between a position of rest, toward which they are resiliently biased, and a position for unlocking the articulation (34), the positions of the two control levers (72, 74) being independent of each other.

7 Claims, 7 Drawing Sheets

SEAT STRUCTURE FOR A MOTOR VEHICLE PROVIDED WITH AN IMPROVED CONTROL OF THE ARTICUATION OF THE BACKREST

BACKGROUND OF THE INVENTION

The present invention relates to a seat structure for a motor vehicle provided with an improved control of the articulation of the backrest.

There is already known in the art a seat structure for a motor vehicle of the type comprising a backrest pivotally mounted on another part of the seat structure by means of a lockable articulation having a transverse axis, and means for controlling the unlocking of this articulation.

FR-A-2 687 621 (FR-92 02 172) discloses a seat structure of this type adapted to be mounted for example in a monospace vehicle.

This seat structure may be placed in different optional configurations so as to form a normal seat structure adapted in particular for driving, a relaxing seat structure, a bed or a small table. If desired, the seat structure may be withdrawn from the passenger compartment.

The various configurations of the seat structure are selected by unlocking in particular the articulation of the backrest and swinging this backrest about the transverse axis of the articulation.

Conventionally, the unlocking of the articulation of the backrest is controlled by a member carried by a lateral part of the seat structure.

Now, it is not always easy for a user who desires to modify the configuration of the seat structure to reach the part of this seat structure on which the control member is placed, in particular when this user enters the compartment through the rear part of the latter.

U.S. Pat. No. 4,913,494, discloses a seat structure for a motor vehicle of the type comprising a backrest pivotally mounted on another part of the seat structure by means of a lockable articulation having a transverse axis, and means for controlling the unlocking of this articulation comprising two control levers separately articulated to two distinct parts of the seat structure for movement between a position of rest toward which they are resiliently biased, and a position for unlocking the articulation, the positions of the two control levers being independent of each other.

SUMMARY OF THE INVENTION

An object of the invention is to optimize access to the control means for unlocking the articulation of the backrest.

For this purpose, the invention provides a seat structure for a motor vehicle of the type disclosed in U.S. Pat. No. 4,913,494, characterized in that the control means for controlling the unlocking further comprise a control pin shiftable in rotation between a position for locking the articulation, to which it is resiliently biased, and a position for unlocking the articulation, the control levers actuating means for shifting the control pin in opposition to the force exerted by said biasing of said pin, and the shifting means comprising a rocker connected to rotate with the control pin and two shifting levers actuated respectively by the two control levers and adapted to cooperate respectively with two opposite arms of the rocker so as to shift the rocker in the same direction of rotation toward the articulation unlocking position of the control pin.

According to other features of the invention:

one of the shifting levers and the control lever which actuates it constitute one and the same lever having a control arm and a shifting arm;

one of the shifting levers is connected to the control lever which actuates it through a cable of the Bowden type;

one of the control levers is articulated to the rear part of the backrest;

one of the control levers is articulated to a lateral part of the seat of the seat structure;

the seat structure comprises safety means for opposing, in the event of a longitudinal shock on the seat structure, the accidental displacement of the pin toward the unlocking position thereof under the effect of the displacement, by inertia, of either one of the control levers toward the unlocking position thereof;

said safety means comprise an inertia member which is mounted to be pivotable about an axis substantially parallel to the axis of the control pin and is displaceable by inertia, upon a longitudinal shock on said seat structure, between a position spaced away from an element connected to rotate with the control pin, toward which the inertia member is resiliently biased, and a position in contact with said element in which position the inertia member opposes rotation of the control pin in the direction for unlocking the articulation, by cooperation of complementary stops.

A better understanding of the invention will be had from the following description which is given solely by way of example with reference to the accompanying drawings in which:

DESCRIPTION OF A PREFERRED EMBODIMENT

Figure 1:
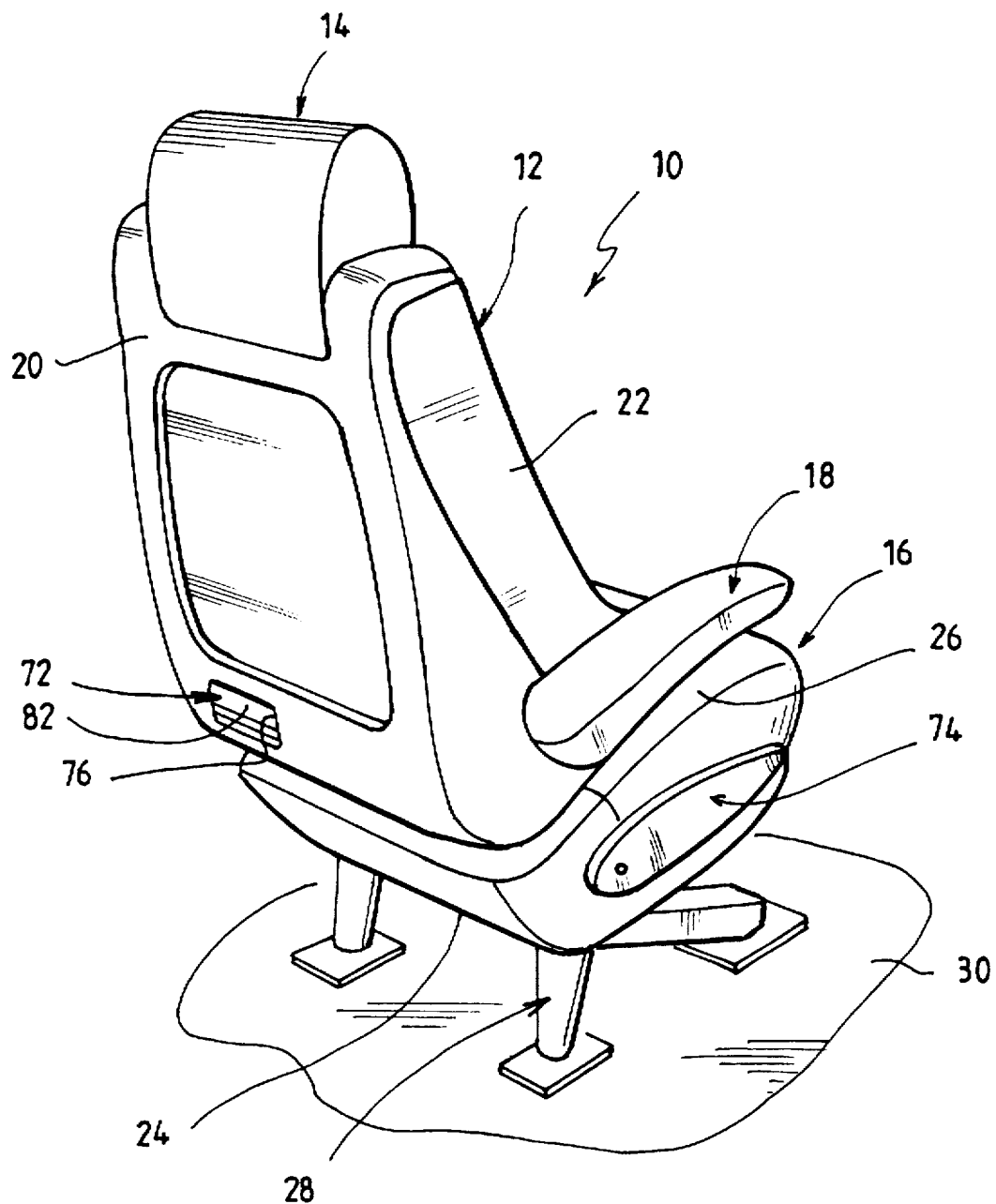
FIG. 1 a perspective view of a seat structure according to invention for a motor vehicle.

Shown in FIG. 1 is a seat structure according to the invention designated by the general reference numeral 10 for a motor vehicle.

Conventionally, the seat structure 10 comprises a backrest 12 surmounted by a headrest 14, a seat 16 and two armrests 18 only one of which is shown in FIG. 1.

The rear part of the backrest is defined by a rigid shell 20. The front part of this backrest is defined by padding 22.

The lower part of the seat and, partly the lateral parts of the seat, are defined by a rigid shell 24. The upper part of the seat is defined by padding 26.

The seat structure 10 further comprises legs 28 fixed in the known manner, for example removably fixed, to a floor 30 of the vehicle.

Figure 2:
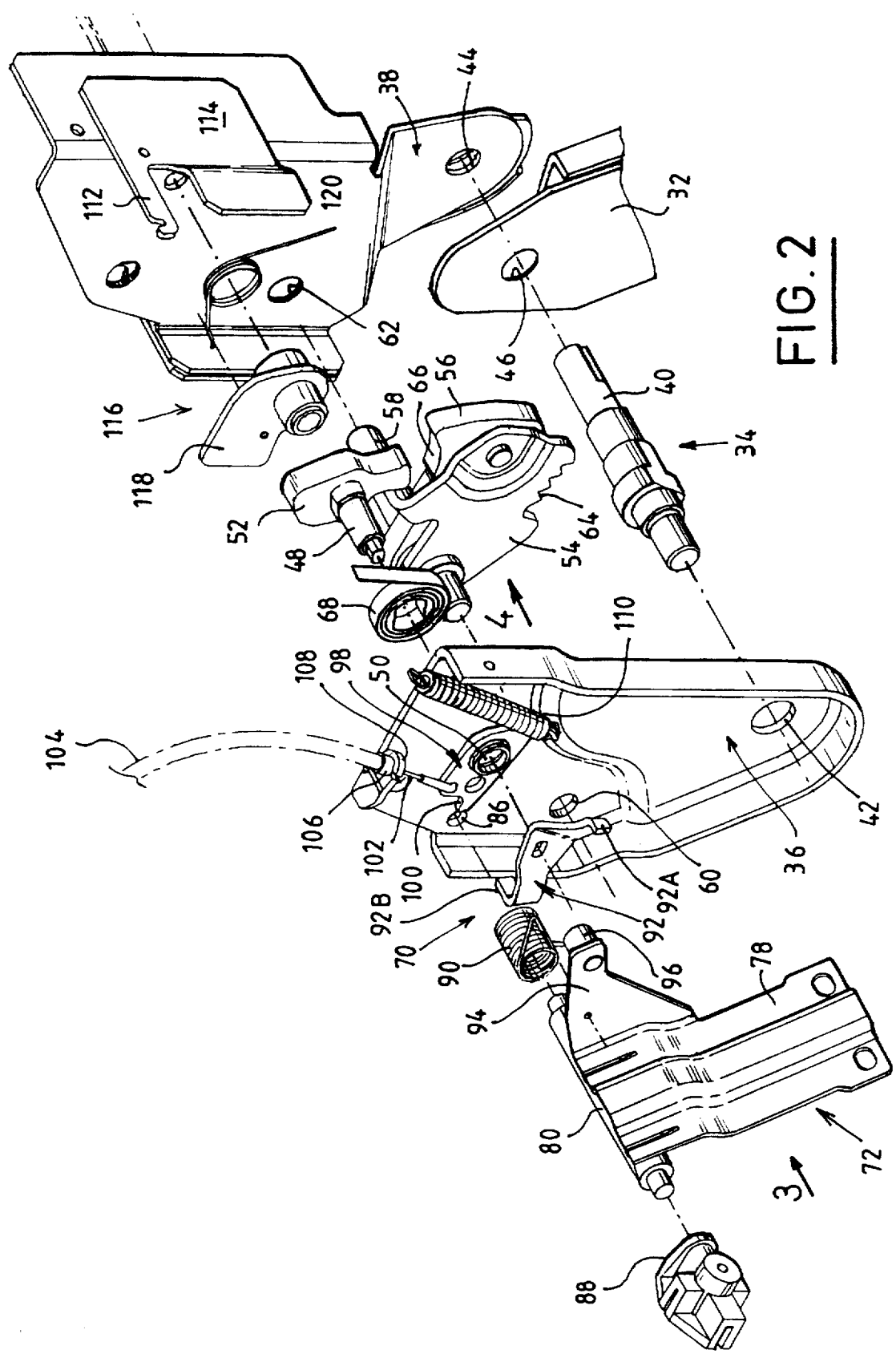
FIG. 2 is an exploded perspective view of the articulation of the backrest of the seat structure shown in FIG. 1.

The backrest 12 is pivotally mounted on a fixed frame 32 of the seat structure partly shown in FIG. 2, by a conventional lockable articulation 34 having a transverse axis, also partly shown in FIG. 2.

The articulation 34 is of the type disclosed in FR-A2 687 621. It is disposed between two members 36, 38 forming side walls which carry the articulation and are connected to a frame of the backrest (not shown in the drawings).

The side walls, 36, 38 are transversely spaced apart by conventional spacer means (not shown).

Shown in FIG. 2 is a backrest articulation pivot pin 40 rotatively mounted in two openings 42 to 46 which form bearings and are provided in the side walls 36, 38 and the frame 32.

Also shown in FIG. 2 is a pin 48 controlling the unlocking of the articulation 34 having an axis parallel to the axis of the pivot pin 40 and rotatively mounted in an opening 50 forming a bearing provided in the side wall 36.

The end of the control pin 48 carries a cam 52.

Also shown in FIG. 2 are two members 54, 56 of the articulation 34, connected to a pin 58 rotatively mounted in two openings 60, 62 forming bearings respectively provided in the two side walls 36, 38.

The member 54 defines teeth 64. The member 56 defines a cam follower 66 associated with the cam 52.

Figure 4:
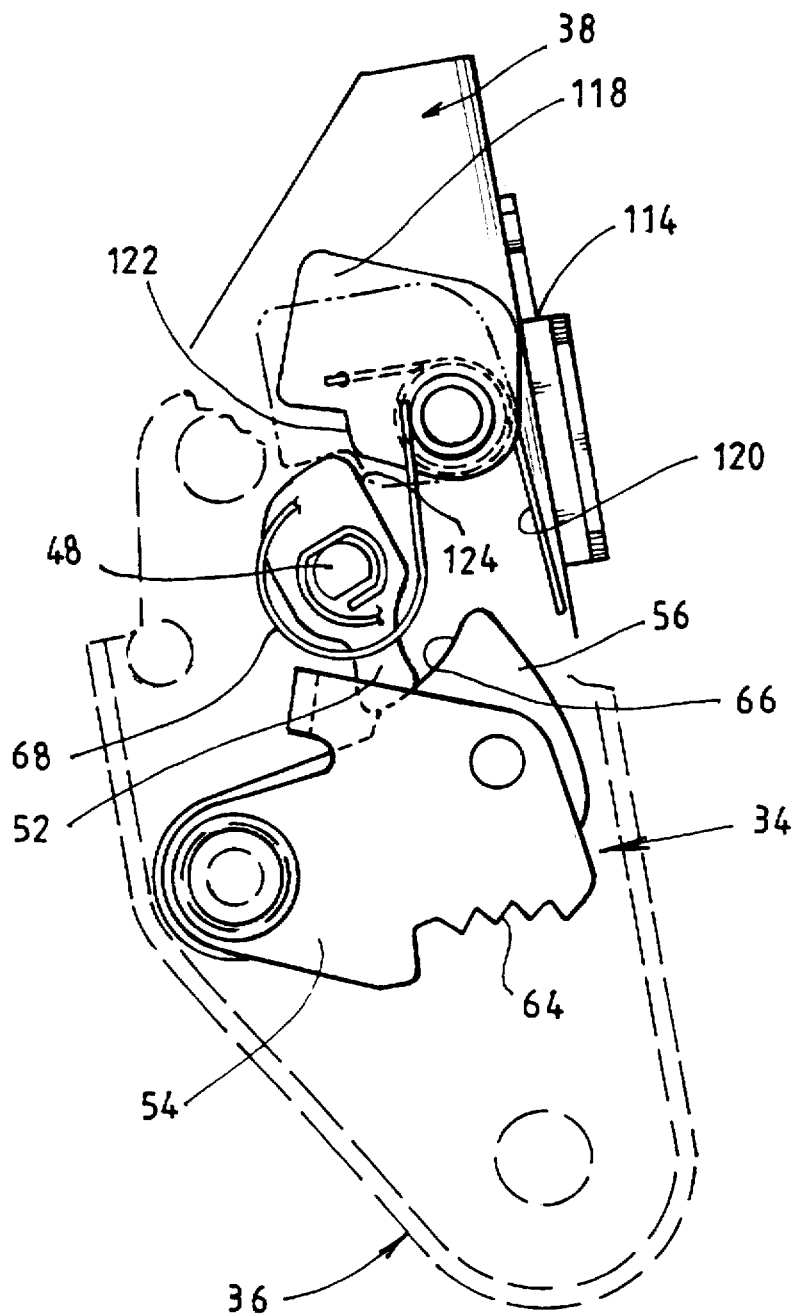

The pin 48 controlling the unlocking is resiliently biased, by a return spring 68 having an angular effect, toward a position for locking the articulation 34, as shown in FIG. 4. In this position, the cam 52 and the cam follower 66 are in contact with each other. Note that the articulation 34 has only been partly illustrated and described. All of the elements making up this type of articulation and the precise operation thereof are described in FR-A-2 687 621.

The seat structure 10 further comprises means 70 for controlling the unlocking of the articulation 34 which will be described hereinafter. The means 70 comprise two control levers 72, 74 separately articulated to two distinct parts of the seat structure.

A first control lever 72 is articulated to be pivotable about a transverse axis of the seat structure on a rear part of the backrest 12 so as to be accessible through an opening 76 provided in the shell 20. The second control lever 74 is articulated to be pivotable about a transverse axis of the seat structure on a lateral part of the seat 16 and extends substantially longitudinally along a lateral edge of the shell 24 (see FIG. 1).

Figure 3:
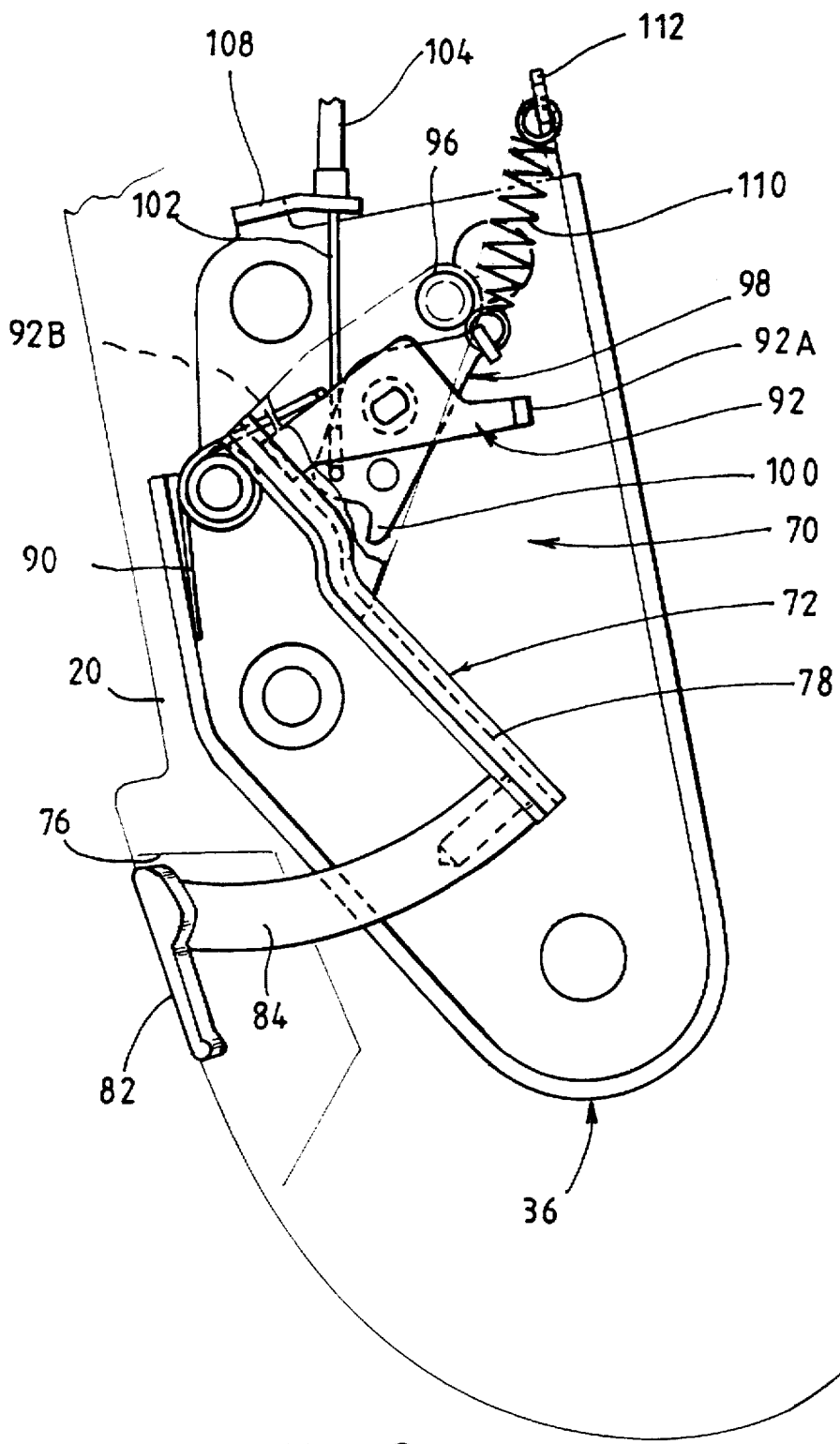
FIGS. 3 and 4 are views in the direction of arrows 3 and 4 respectively of FIG. 2 in which the articulation is locked.

The first control lever 72 is shown in more detail in particular in FIGS. 2 and 3.

In these Figures it can be seen that the first control lever 72 comprises an arm 78 in the general shape of a plate one end of which is connected to a pin 80 of the articulation of the lever 72 and the other end of which is connected to a control knob 82 by a curved connecting member 84.

For reasons of clarity, the knob 82 and the connecting member 84 have not been shown in FIG. 2.

The articulation pin 80 is rotatively mounted in openings 86, only one of which is shown in FIG. 2, respectively provided in the side wall 36 and a member 88 connected to the frame of the backrest.

The control levers 72, 74 are shiftable between a position of rest, toward which they are resiliently biased, and a position for unlocking the articulation 34, the positions of these two control levers being independent of each other.

Note that the first control lever 72 is resiliently biased toward its position of rest by a spring 90 having an angular effect.

The control levers 72, 74 are adapted to actuate means for shifting the control pin 48 illustrated in particular in FIGS. 2 and 3.

These shifting means are adapted to oppose the resilient biasing return force exerted on the control pin 48 and comprise a rocker 92 connected to rotate with the pin 48.

The rocker 92 is carried by the end of the pin 48 which is remote from the cam 52 and extends through the opening 50 in the side wall 36.

The shifting means further comprise two shifting levers respectively actuated by the two control levers 72, 74 and adapted to cooperate respectively with two opposite arms 92A, 92B of the rocker so as to shift the latter in the same direction of rotation toward the articulation unlocking position of the control pin 48.

A first shifting lever and the control lever 72, which actuates it, form one and the same lever provided with the control arm 78 and a shifting arm 94 in the general shape of a plate substantially perpendicular to the control arm 78.

The free end of the shifting arm 94 is provided with a stud 96 adapted to cooperate with the end of a first arm 92A of the rocker.

The second shifting lever 98 is pivotally mounted on the side wall 36 coaxially with the control pin 48 so as to be capable of pivoting about this control pin.

A first end of the second shifting lever 98 is extended by a lug 100 adapted to cooperate with the bent end portion of the arm 92B of the rocker.

This end portion of the shifting lever 98 is connected to the second control lever 74 by means of a conventional flexible cable 102 of the Bowden type.

This cable 102 is slidably mounted inside a sleeve 104 one end of which is shown to be immobilized by a stop ring 106 which bears against a seat 108 rigid with the side wall 36.

The second shifting lever 98 is resiliently returned or biased to the position of rest, corresponding to the position of rest of the second control lever 74 which actuates it, by a tension spring 110 which connects the second end of this shifting lever 98 to a hook 112 cut out from a member 114 fixed to the side wall 38.

When the shifting levers 72, 98 are in the position of rest, the stud 96 and the lug 100 are disposed on the down stream side of or beyond the corresponding arms 92A, 92B of the rocker with respect to the direction for unlocking the articulation 34, as they are spaced away from these arms.

Shown in particular in FIGS. 2 and 4 are safety means 116 which oppose, in the event of a longitudinal shock on the seat structure, the accidental displacement of the control pin 48 toward its articulation unlocking position.

This accidental displacement could occur, upon a shock, under the effect of the displacement, by inertia, of either one of the control levers toward its articulation locking position.

These safety means 116 comprise a plate 118, forming an inertia member, which is mounted to be pivotable about an axis substantially parallel to the axis of the control pin 48 and is displaceable by the effect of inertia upon a longitudinal shock on the seat structure, between a position spaced away from the cam 52, as shown in full lines in FIG. 4, and a position of contact with the cam 52, as shown in dot-dash lines in FIG. 4.

The inertia member 118 is biased toward the position in which it is spaced away from the cam 52 by a return spring 120 having an angular effect. In this position, the inertia member 118 abuts against a portion of the member 114.

When the inertia member 118 is in the position of contact with the cam 52, it opposes rotation of this cam in the articulation unlocking direction by cooperation of complementary stops 122, 124 provided on the edge of the inertia member and on the cam.

The means 70 for controlling the unlocking of the articulation operate in the following manner:

Initially, the control levers 72, 74 and the shifting means they actuate are in positions of rest as shown in FIGS. 1 and 3.

The positions of rest of the control levers 72, 74 are determined by stops (not shown) arranged in the conventional manner in the seat structure.

Note that, in this case, the knob 82 is flush with the outer contour of the opening 76.

The articulation 34 is locked as shown in FIG. 4.

Figure 5:
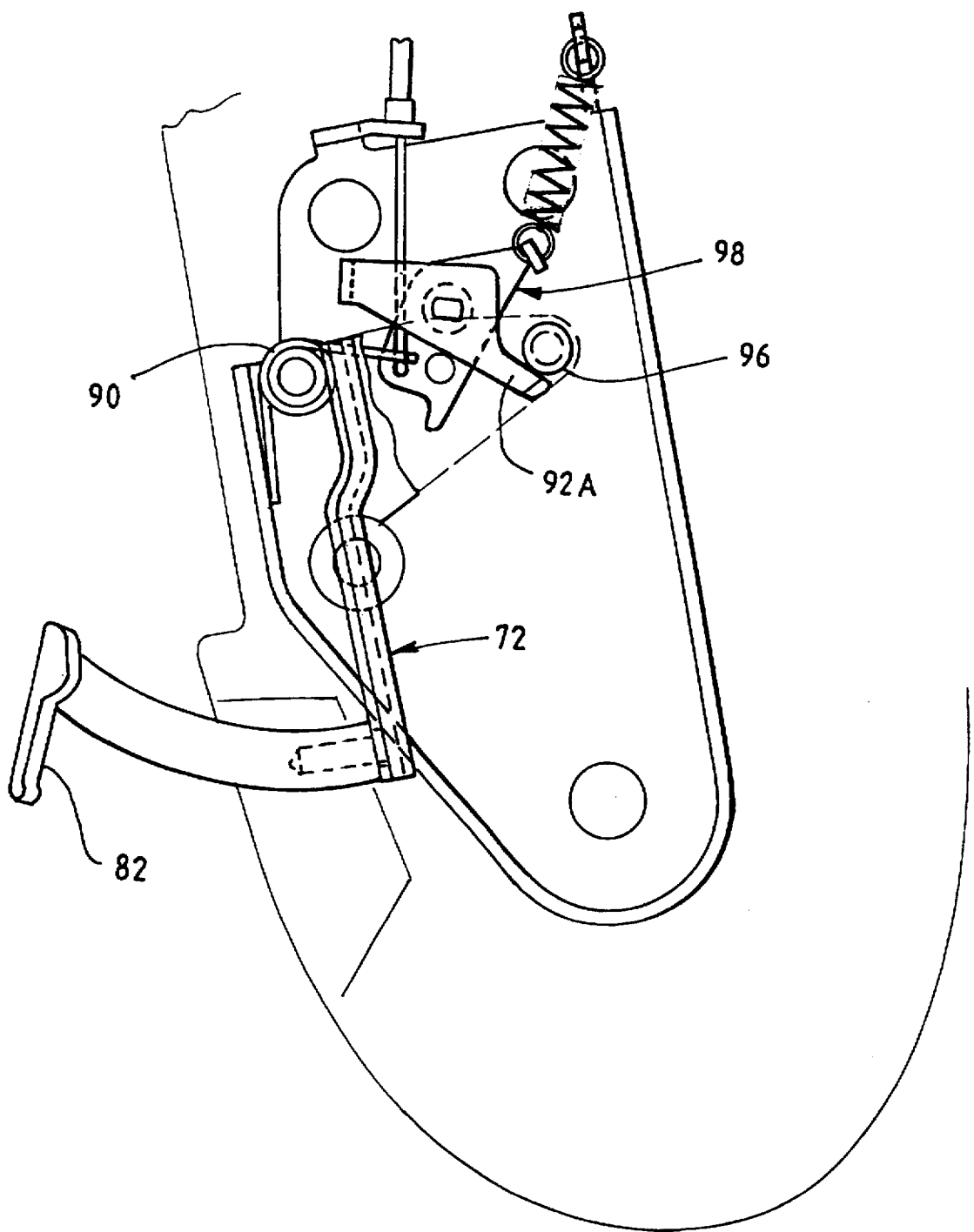
FIGS. 5 and 6 are views similiar to FIGS. 3 and 4 in which the articulation is unlocked under the effect of the actuation of the control lever articulated to a rear part of the backrest.

In order to unlock this articulation by mean s of the first control lever 72, the knob 82 is actuated by pulling it in a direction away from the shell 20, as shown in FIG. 5.

The stud 96 then comes in contact with the first arm 92A of the rocker and urges the latter in the clockwise direction (as seen in FIG. 5) corresponding to the articulation unlocking direction. The second shifting lever 98 remains stationary.

Figure 6:
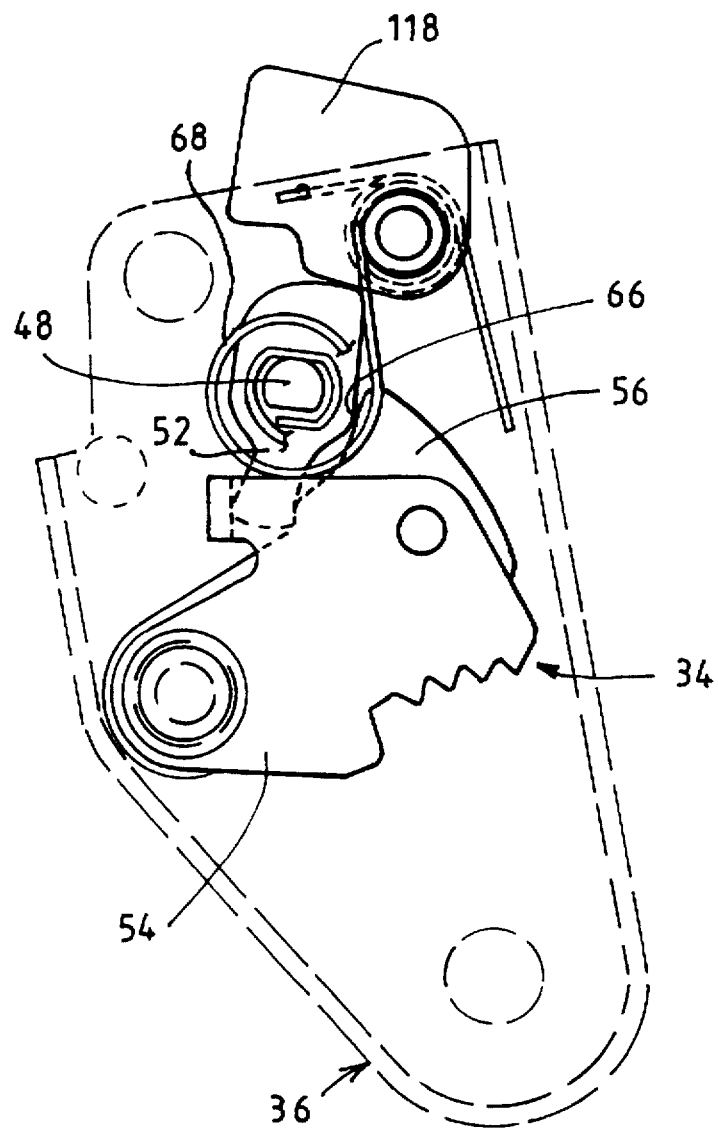

The cam 52 rotates with the rocker 92 in a direction away from the cam follower 66 as shown in FIG. 6, and unlocks the articulation 34 in accordance with the operation of this articulation disclosed in FR-A-2 687 621.

When the knob 82 is released, the control lever 72 is resiliently returned to its position of rest by the spring 90. At the same time, the cam 52 is resiliently returned to its articulation locking position by the spring 68.

Figure 7:
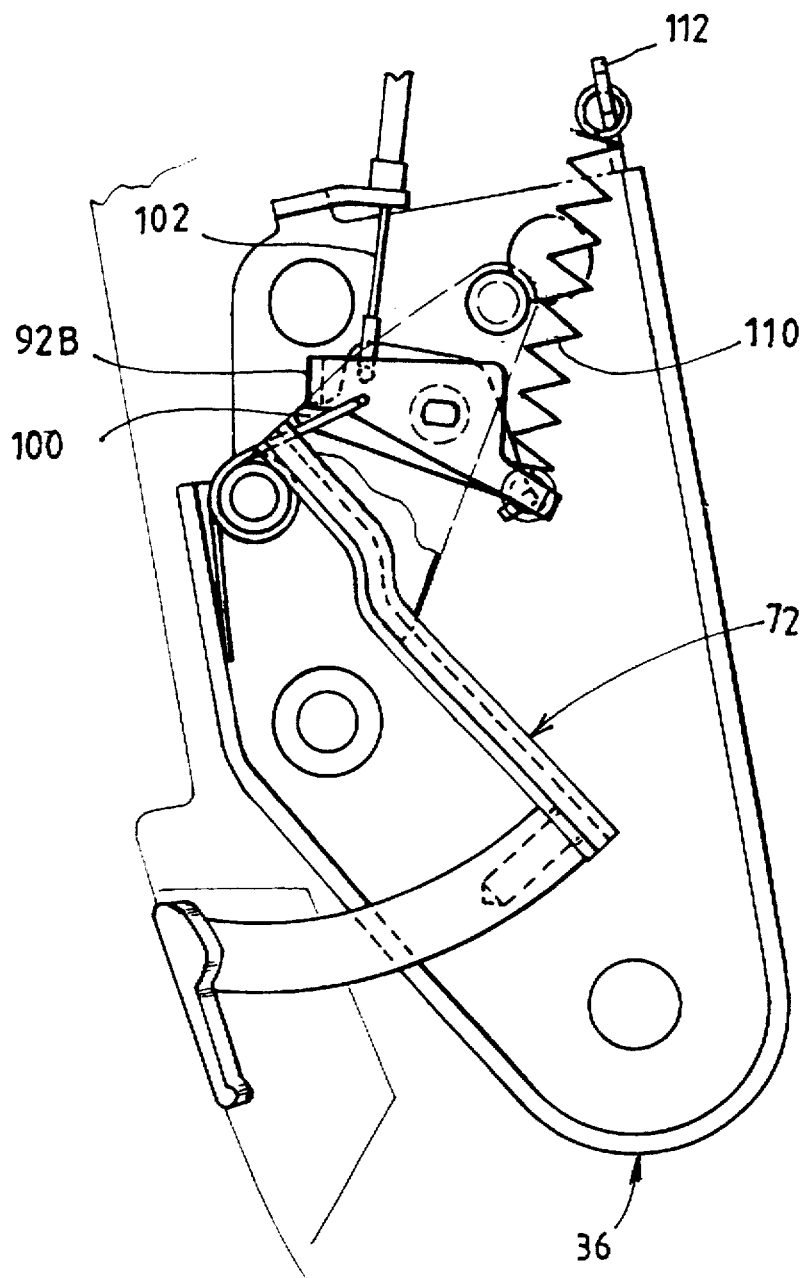
FIG. 7 is a view similiar to FIG. 3 in which the articulation is unlocked under the effect of the actuation of the control lever articulated to a lateral part of the seat of the seat structure.

In order to unlock the articulation 34 by means of the second control lever 74, the latter is raised and this has for effect to drive, through the medium of the cable 102, the second shifting lever 98 in the clockwise direction for unlocking the articulation, as shown in FIG. 7.

The lug 100 then comes in contact with the second arm 92B of the rocker and produces on the latter and on the unlocking pin 48 the same effects as those described hereinbefore when actuating the first control lever 72.

Note that, when the second control lever 74 is actuated, the first control lever remains stationary.

When the second control lever 74 is released, the second actuating lever 98 is returned to its position of rest by the spring 110.

An additional return spring (not shown in the drawings) directly connected to the second control lever 74 biases the latter to the position of rest.

The invention has many advantages.

In particular, the two control levers, one of which is articulated to a rear part of the backrest while the other is articulated to a lateral part of the seat, are easily accessible and enable a user to control the unlocking of the articulation of the backrest whatever the position of the user with respect to the seat structure.

Further, the movements of the control levers are independent of each other.

Moreover, the positions of rest of these levers are independent of the positions of the various elements of the articulation, in particular the control pin of the articulation, so that the positions of rest of these control levers are unaffected by the manufacturing tolerances and wear of the various elements of the articulation.

What is claimed is:

1. A seat structure for a motor vehicle comprising in combination:

a backrest, a lockable articulation having a transverse axis extending transversely of said seat structure and pivotally mounting said backrest on a part of said seat structure, means for controlling the unlocking of said articulation comprising two control levers separately articulated to two distinct parts of said seat structure each for movement between a position of rest and a position for unlocking said articulation, the positions and movements of the two control levers being independent of each other, first and second resilient biasing means for respectively biasing said two control levers toward said position of rest of each of said control levers, said means for controlling said unlocking further comprising a control pin having a cam fixed thereon shiftable in rotation between a position locking said articulation and a position unlocking said articulation, third resilient biasing means for biasing said control pin toward said position locking said articulation, shifting means for shifting said control pin in opposition to resilient biasing of said third resilient biasing means of said control pin, said shifting means comprising a rocker having two opposite arms fixed to and rotating with said control pin, and at least one lever movably connected to and actuated by one of the two control levers and cooperatively engaged with a respective one of said two opposite arms of said rocker so as to shift said rocker in a direction of rotation toward the position of said control pin for unlocking said articulation.

2. Seat structure according to claim 1, wherein one of said shifting levers and the associated control lever which actuates it constitute one and the same lever having a control arm and a shifting arm.

3. Seat structure according to claim 1, comprising a flexible cable operatively connecting one of said shifting levers to the associated control lever which actuates it.

4. Seat structure according to claim 1, wherein one of said control levers is articulated to a rear part of said backrest.

5. Seat structure according to claim 1, wherein one of said control levers is articulated to a lateral part of said seat of said seat structure.

6. Seat structure according to claim 1, comprising safety means for opposing in the event of a longitudinal shock on said seat structure, an accidental displacement of said control pin toward said articulation unlocking position thereof under the effect of a displacement, by inertia, of either one of said control levers toward the articulation unlocking position thereof.

7. Seat structure according to claim 6, wherein said safety means comprise in combination: an element connected to rotate with said control pin, an inertia member which is mounted to be pivotable about an axis substantially parallel to said axis of said control pin and is pivotable, by inertia, upon a longitudinal shock on said seat structure, between a position in which it is spaced from said element connected to rotate with said control pin and a position in contact with said element connected to rotate with said control pin, in which position of contact said inertia member opposes rotation of said control pin in the direction for unlocking said articulation, by cooperation of complementary stops, and means for resiliently biasing said inertia member toward said position thereof in which it is spaced from said element connected to rotate with said control pin.

* * * * *